United States Patent [19]

Rallis et al.

[11] E Re. 31,400

[45] Reissued Oct. 4, 1983

[54] SELF PROPELLED AND EXTENSIBLE BOOM

[75] Inventors: Rallie P. Rallis, Cerritos; Richard E. Cullity, La Mirada; Lyle R. Tamplin, Anaheim, all of Calif.

[73] Assignee: Mark Industries, Carson, Calif.

[21] Appl. No.: 315,221

[22] Filed: Oct. 26, 1981

Related U.S. Patent Documents

Reissue of:

[64] Patent No.: 4,226,300
Issued: Oct. 7, 1980
Appl. No.: 13,689
Filed: Feb. 21, 1979

[51] Int. Cl.[3] ..... B66F 11/04

[52] U.S. Cl. ..... 182/2; 212/195

[58] Field of Search ..... 182/2, 63, 141, 148, 182/65-67; 212/196, 197, 198, 266-269; 191/12 R; 52/118, 117

[56] References Cited

U.S. PATENT DOCUMENTS

| | | | |
|---|---|---|---|
| 1,068,279 | 7/1913 | Schrader | 212/49 |
| 1,139,915 | 5/1915 | Smulders | 212/49 |
| 1,343,630 | 6/1920 | Locarni | 212/48 |
| 2,627,560 | 2/1953 | Eitel | 182/2 |
| 2,786,723 | 3/1957 | Harsch | 182/2 |
| 2,787,278 | 4/1957 | Mitchell | 182/2 |
| 2,954,092 | 9/1960 | Trump | 182/2 |
| 3,029,088 | 4/1962 | Loef | 212/195 |
| 3,056,465 | 10/1962 | Gerrand | 182/2 |
| 3,095,945 | 7/1963 | Mitchell | 182/63 |
| 3,136,385 | 6/1964 | Eitel | 182/2 |
| 3,156,313 | 11/1964 | Peterson | 182/2 |
| 3,212,604 | 10/1965 | Garnett | 182/2 |
| 3,305,220 | 2/1967 | Nevulis | 191/12 R |
| 3,319,739 | 5/1967 | Morse | 182/2 |
| 3,379,279 | 4/1968 | Slusher | 182/2 |
| 3,446,159 | 5/1967 | Lawson | 191/12 R |
| 3,509,965 | 5/1970 | Mitchell | 182/62.5 |
| 3,524,521 | 8/1970 | Boomgaarden | 182/46 |
| 3,536,218 | 10/1970 | Guinot | 214/142 |
| 3,542,068 | 11/1970 | Prescott | 182/2 |
| 3,605,941 | 9/1971 | Edwards | 182/2 |
| 3,674,162 | 7/1972 | Smith | 212/49 |
| 3,709,322 | 1/1973 | Mitchell | 182/62.5 |
| 3,743,049 | 7/1973 | Levrini | 182/2 |
| 3,767,007 | 10/1973 | Garnett | 182/2 |
| 3,809,180 | 5/1974 | Grove | 182/2 |
| 3,841,436 | 10/1974 | Grove | 182/2 |
| 3,845,596 | 11/1974 | Veenstra | 52/118 |
| 3,856,108 | 12/1974 | Grove | 182/2 |
| 3,861,498 | 1/1975 | Grove | 182/2 |
| 3,924,753 | 12/1975 | Lamer | 212/48 |
| 3,937,340 | 2/1976 | Grove | 182/2 |
| 3,983,960 | 10/1976 | Sikli | 182/141 |
| 4,008,791 | 2/1977 | Kahany | 191/12.2 R |
| 4,009,843 | 3/1977 | Gomez | 242/107 |
| 4,010,913 | 3/1977 | Guester | 242/107 |
| 4,039,094 | 8/1977 | Grove | 182/2 |
| 4,044,902 | 8/1977 | Eitel | 182/2 |
| 4,113,065 | 9/1978 | Sikli | 182/141 |
| 4,118;907 | 10/1978 | Small | 52/115 |
| 4,133,411 | 1/1979 | Curb | 182/2 |
| 4,160,492 | 7/1979 | Johnston | 182/2 |

FOREIGN PATENT DOCUMENTS

| | | |
|---|---|---|
| 2077816 | 5/1971 | France . |
| 1098515 | 1/1968 | United Kingdom . |

OTHER PUBLICATIONS

Selma Manufacturing Co., drawing No. 001-0073 for Model MZ36A, Exhibit 301-A, 1975.

Dur-A-Scamp Lift, Durnell Eng. Co., 1976, Exhibit 334.

Fulton Industries Inc., JLG Model 36XF, 1975 Exhibits 347 & 352.

JLG Model 40 designated Model 40N., Exhibit 375.

Exhibit 390, JLG Model 20, 1974, shown in U.S. Pat. No. 3,856,108.

*Primary Examiner*—Reinaldo P. Machado

*Attorney, Agent, or Firm*—Robert R. Thornton

[57] ABSTRACT

A self-propelled rotatable hydraulic lift having a body with an extensible boom pivotally attached to the upper rear portion of a counterweight and terminating in a self-leveling workman's platform. Remote lift controls are provided at the platform by means of control lines contained in flexible conduits within the boom. The center of gravity of the counterweight is located between the pivotal connection of the boom and the axis of rotation of the boom to provide both improved stability with respect to back tipping when the boom is extended vertically and a smaller rotational diameter for the lift body.

11 Claims, 12 Drawing Figures

Fig. 11
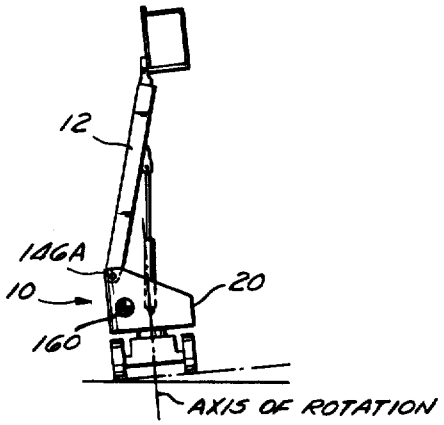
Fig. 12 (PRIOR ART)
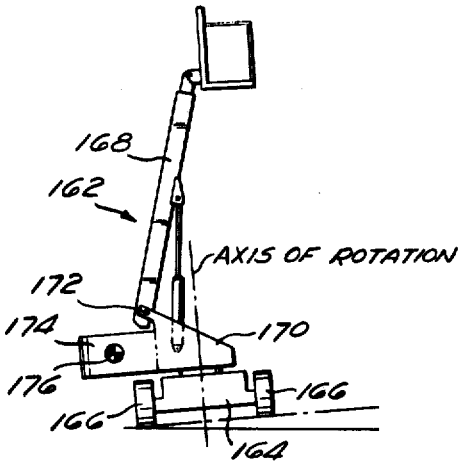
Fig. 9
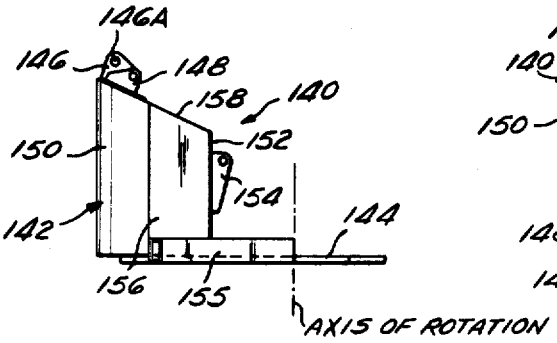
Fig. 10
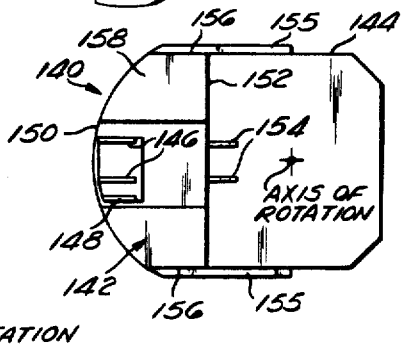
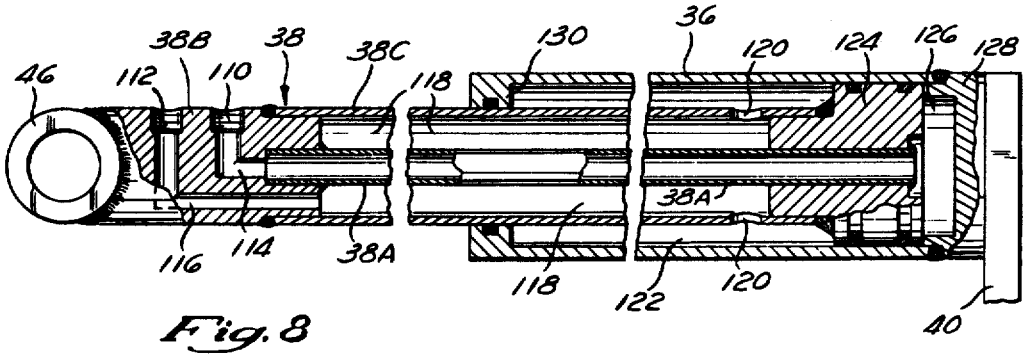
Fig. 8

SELF PROPELLED AND EXTENSIBLE BOOM

Matter enclosed in heavy brackets [ ] appears in the original patent but forms no part of this reissue specification; matter printed in italics indicates the additions made by reissue.

BACKGROUND OF THE INVENTION a. Field of the Invention

This invention relates to self-propelled hydraulic lifts of the type having an extensible boom terminating in a work platform.

b. Brief Description of the Prior Art

Self-propelled hydraulic lifts are well-known, as, for example, is shown in U.S. Pat. No. 3,319,739, issued May 16, 1967. Extensible and rotatable booms on devices of this general type are also well known as is shown, for example, in U.S. Pat. No. 2,786,723, issued Mar. 26, 1957. Extensible boom assemblies which provide for remote control of the boom at a workman's platform attached to the outer end of the boom are illustrated, for example, in U.S. Pat. No. 3,136,385, issued June 9, 1964 to J. M. Eitel and U.S. Pat. No. 3,379,279 issued Apr. 23, 1968 to E. G. Slusher.

However, such conventional lifts suffer from several disadvantages which limit their utility. For example, such lifts, conventionally, have either been mounted on a truck body, U.S. Pat. No. 3,136,385, for example, or have utilized a counterweight extending significantly beyond the point of attachment of the boom to the lift. In either event, the resulting structure is relatively large, limiting its access and/or rotation to comparatively wide passageways. Furthermore, when an extensible boom has been used, control cables necessarily included within the boom for remote control of the lift have been subject to wear and failure by reason of the repeated stresses applied thereto during boom extension and retraction.

SUMMARY OF THE INVENTION

A hydraulic lift, according to the present invention, includes a self-propelled frame including four wheels with a rotatable body mounted thereon. Counterweight means are mounted on said body at one side thereof, said counterweight means tapering downwardly inwardly to the center of the frame, said counterweight *means* being so disposed with respect to said frame so as not to extend substantially beyond the track of the frame when the body is rotated. Means are provided for pivotally attaching a lift boom to the upper portion of counterweight means so that the boom pivots at the outer edge of the counterweight means, so that the center of gravity of the counterweight *means* lies between the boom-counterweight pivotal connection and the axis of rotation of the boom.

If the lift boom is to be extensible, the lift boom includes an outer boom, which is pivotally attached to the counterweight means, and an inner boom disposed within said outer boom. Remote control means are located at a workman's platform and are operable to control the position of the workman's platform relative to the frame, including hydraulic and electrical conductor lines passing through the inner and outer booms and extending to the workman's platform, where the remote controls are located.

The extension of the lift boom is controlled by a rod-fed hydraulic cylinder connected between the inner boom and outer boom, with its cylinder rod preferably connected to the outer boom. Flexible conduits having first ends fixed to the outer boom interior remote from the boom-counterweight pivotal connection and second ends fixed to the inner boom interior adjacent the boom-counterweight pivotal connection contain the hydraulic and electrical conductor lines. A carrier assembly is mounted on and slidable along the cylinder rod, and a sheave for each flexible conduit, around which said flexible conduit passes, is rotatably fixed to the carrier assembly. Carrier assembly retraction means moves the carrier assembly along the cylinder rod in the direction of movement of the inner boom but at one-half the rate of movement thereof. The carrier retraction assembly consists of a retraction cable, fixed at one end to the outer boom interior adjacent the boom-counterweight pivotal connection, a carriage idler pulley attached to the carrier assembly, a rear outer boom idler pulley attached to the outer boom interior adjacent to the boom-counterweight pivotal connection, and a front outer boom idler pulley attached to the outer boom interior remote from the boom-counterweight pivotal connection. The carrier retraction cable passes around the aforementioned pulleys in the order listed, with the other end fixed to the inner boom adjacent the boom-counterweight pivotal connection.

BRIEF DESCRIPTION OF THE DRAWING

The invention may be more readily understood by referring to the accompanying drawing by which

FIG. 8 is a plan view, in section and broken away, of a rod-fed hydraulic cylinder;

FIG. 9 is a side elevation of a counterweight structure according to the present invention; and FIG. 10 is a plan view of the counterweight *structure* of FIG. [10] *9*;

FIG. 11 is an end view of the lift of FIG. 1 with the boom in its upright position illustrating the position of maximum instability with respect to overtipping;

FIG. 12 is a view of a comparable prior art lift with respect to such maximum instability in overtipping position.

DESCRIPTION OF THE PREFERRED EMBODIMENT

Figures 1, 2:
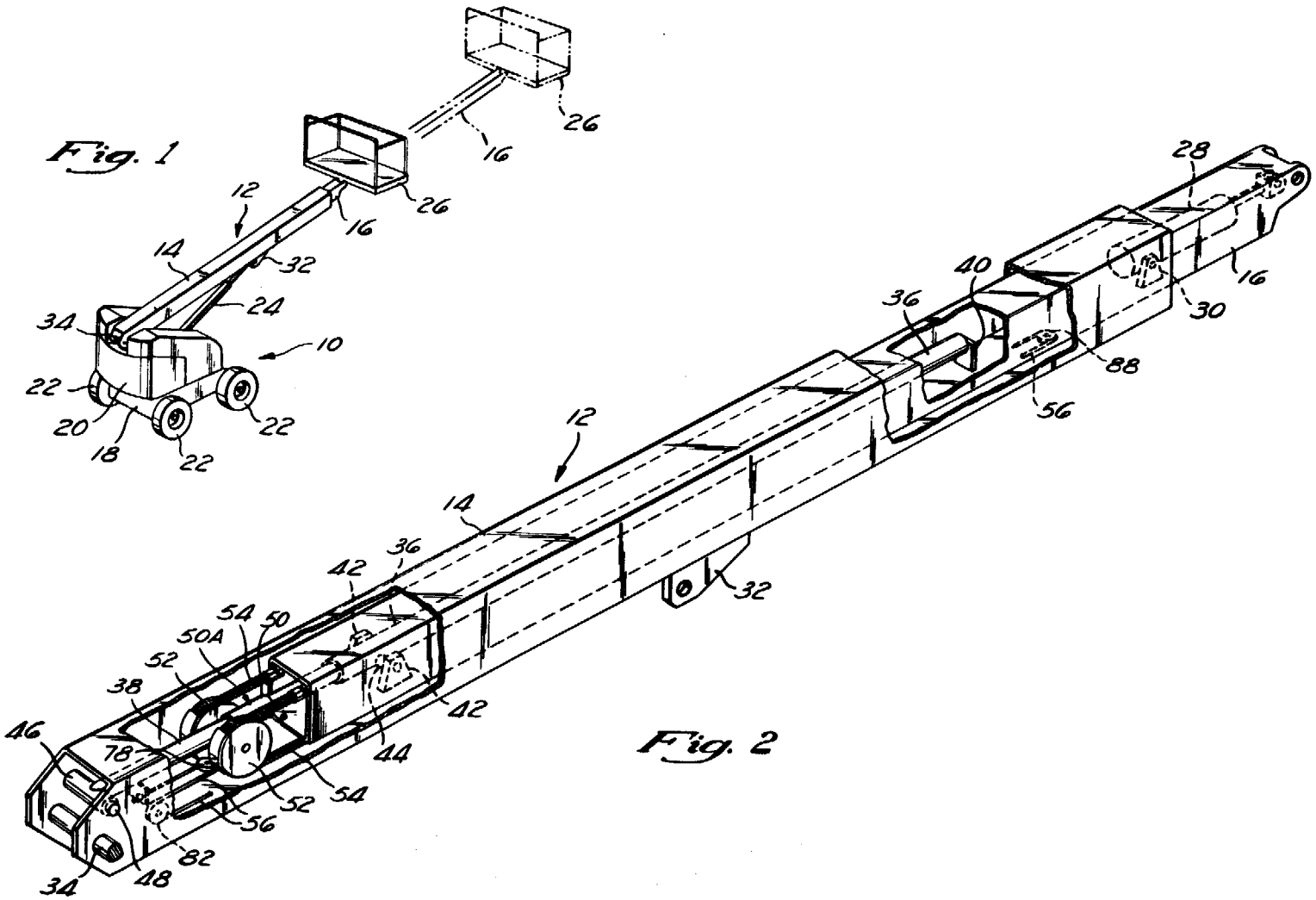
FIG. 1 is a view, in perspective, of a lift according to the present invention.
FIG. 2 is a perspective view, partially broken away, of the boom of the lift shown in FIG. 1.

Referring now to FIG. 1, thereon shown, in perspective, a lift 10 having an extensible boom 12 in its retracted position. The extensible boom 12 is shown in dotted lines in its extended position. The extensible boom 12 has an outer boom 14 and an inner boom 16. The lift 10 has a frame 18 onto which a body or housing 20 is rotatably mounted in conventional fashion. The housing 20 includes a counterweight assembly (see FIGS. 9 and 10). The requisite machinery, fuel tanks, and the like for operation of the lift are contained on the frame and housing. The lift 10 has four wheels 22, the rear two of which, in the preferred embodiment, are individually driven in conventional fashion. The boom is hydraulically actuated both as to length and as to vertical position. The vertical positioning of the boom is accomplished by means of a lift cylinder 24 which is connected between the housing 20 and the outer boom 14. The inner boom 16 terminates in a workman's platform 26. Thus, by rotation of the housing 20 and elevation of the boom 12 by the lift cylinder 24 and extension of the boom 12, the platform 26 can be positioned, as desired, so that the workman may accomplish the task to be performed.

Referring now to FIG. 2, there is shown a perspective view, partially cut away, of the boom 12. The inner boom 16 has a platform slave leveling cylinder 28 attached thereto by a pair of mounts 30 (only one of which is shown in FIG. 2). The leveling cylinder 28 functions to maintain the platform in a level condition in conventional fashion, such as is shown, for example, in U.S. Pat. No. 3,841,436. A lift cylinder mounting bracket 32 is utilized to connect the lift cylinder 24 to the outer boom 14. The outer boom is mounted to the housing 20 by means of a boom mounting pin 34 in conventional fashion. Extension of the boom 12 is accomplished by means of an extension cylinder 36 of a rod-fed hydraulic cylinder type, which has a cylinder rod 38. The cylinder 36 is positioned, at one end, by a cylinder mounting bracket 40 and at its opposite end by a pair of mounting brackets 42 (shown in dotted lines in FIG. 2) which engage trunnions 44 on the cylinder 36. The cylinder rod 38 extends into the cylinder 36 and is fixed to the outer boom 14, adjacent the boom mounting pin 34, by means of a T-shaped termination 46 on the cylinder rod. A mounting pin 48 extends through a bore in the T-shaped termination 46 and through appropriate apertures in the outer boom 14. Mounted on the cylinder rod 38 by means of a carrier assembly 50 are two sheaves 52. A flexible control cable conduit 54 passes around each of the sheaves 52. Within these flexible cable conduits, hydraulic and electrical lines are contained but are shielded from contact with the sheaves and other portions of the boom assembly by means of the conduit 54. Also shown, in part, in FIG. 2 is a carrier assembly retraction cable 56, as will be described in greater detail with respect to FIGS. 3 through 6.

Figures 3, 4:
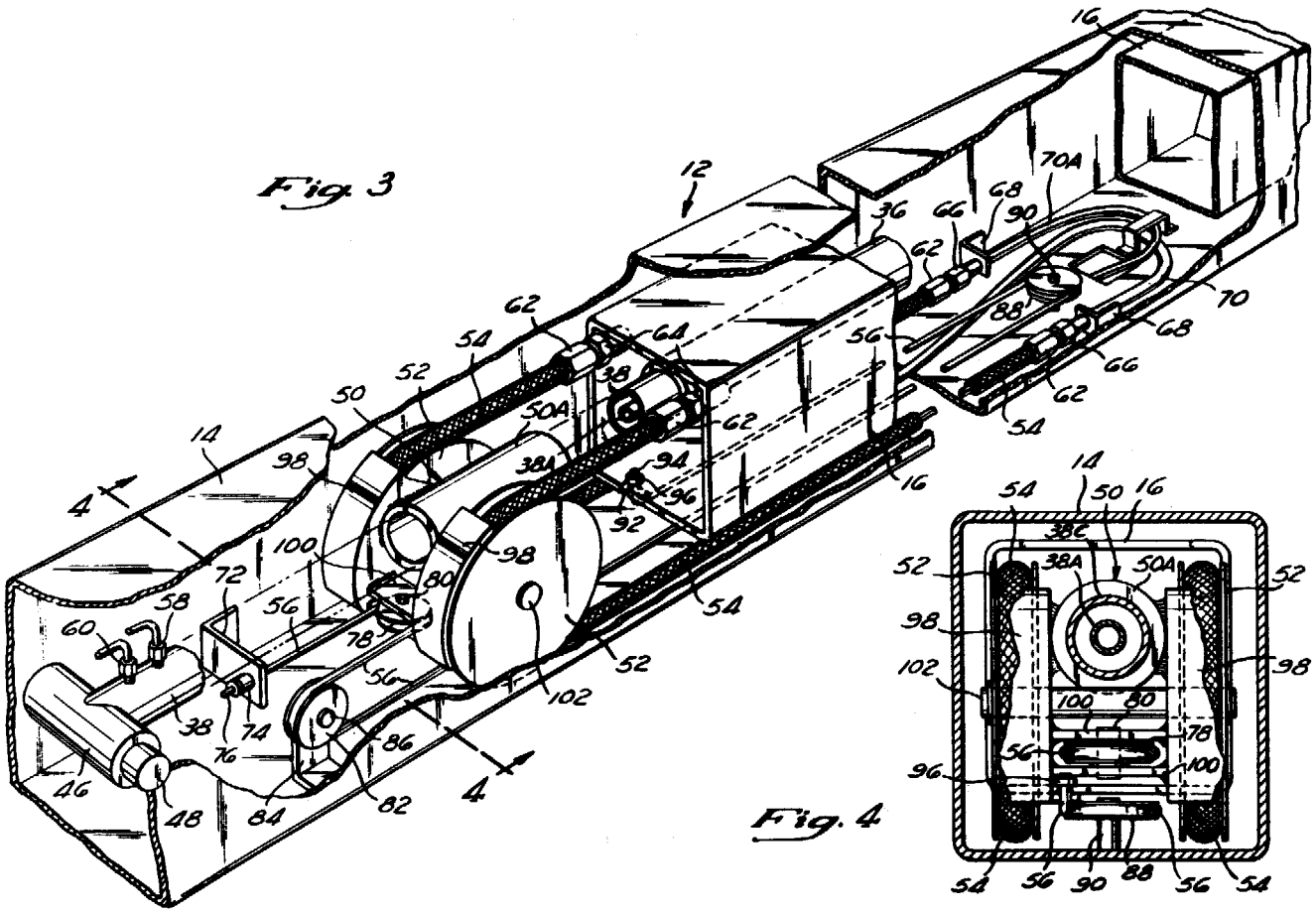
FIG. 3 is a partial sectional view of the boom shown in FIG. 2.
FIG. 4 is a cross-sectional view taken along lines 4—4 of FIG. 3.

In FIG. 3, the boom assembly 12 is shown in greater detail. The cylinder rod 38 has an extension fluid inlet assembly 58 and a retraction fluid inlet assembly 60 adjacent the T-shaped termination 46. The cylinder 36 and the cylinder rod 38 are of conventional construction, with fluid inlets and outlets permitting the selective extension and retraction of the cylinder 36 along the rod 38 by means of passage of hydraulic fluid through a fluid feed tube 38A in the cylinder rod 38. As will be apparent, boom extension, by reason of the cylinder 36 being fixed to the inner boom 16, moves the inner boom 16 away from the boom mounting pin 34 (see FIG. 1) and so causes the lift 10 to assume the configuration of the dotted lines in FIG. 1, whereas retraction causes the cylinder 36 to move toward the boom pivot pin 34 and so cause the lift 10 to assume the configuration shown in solid lines in FIG. 1.

One of the problems which is encountered in booms of this type, in which the workman's platform has remote controls so that the workman, on the platform, can move the platform in elevation and rotation, is the wear upon the control lines which necessarily occurred during boom extension and retraction. The boom 12 eliminates such wear by use of the flexible control cable conduit 54 within which the control lines, either hydraulic or electric, as appropriate, are loosely contained. Thus, the conduit 54 is subjected to whatever wear or strain occurs by reason of rotation around the sheaves 52. Further, in the present invention, means are provided through the carrier assembly retraction assembly 50 to provide for a slight constant tension to be applied on the carrier assembly 50 during boom extension and retraction to urge the carrier assembly toward the boom pivot pin 34, so that the carrier assembly 50 may move in concert with the inner boom 16. The flexible conduits 54 terminate, at either end, in couplings 62. The end of the inner boom adjacent to the carrier assembly 50 has complementary couplings 64 fixed thereto, so as to fix one end of each of the conduits 52 to the inner boom. These complementary couplings are hollow, so as to permit the control lines to pass therethrough. The flexible conduits 54, at their opposite ends, are fixed to the outer boom 14 by means of complementary couplings 66, which are attached to mounting brackets 68, the mounting brackets 68 being welded or otherwise fixed to the inner surface of the outer boom 14. The complementary couplings 66 are hollow and extend through apertures in the mounting brackets 68 so as to permit the passage of control cables 70, 70A therethrough.

While indicated in FIG. 3 for illustrative purposes as a single cable, the control cables 70, 70A may, as appropriate, be two or more hydraulic lines or electrical conductors. As previously stated, the carrier assembly 50 has a slight constant tension applied thereto, so as to maintain slight tension on the flexible conduit 54 during extension and retraction of the inner boom 16. As will be apparent, extension of the inner boom 16 requires the carrier assembly 50, which is slidably mounted on the cylinder rod 38, to move only one half the distance which the inner boom 16 moves. The carrier assembly retraction cable 56 is utilized in order to insure that such movement occurs under slight tension. In order to accomplish this function, the retraction cable 56 is attached to the outer boom 14 by means of a bracket 72 located adjacent the T-shaped cylinder rod termination 46. A threaded fastener 74 engages a thread termination 76 on the carrier retraction cable 56 to provide for adjustment of the tension on the cable by a slight change in effective cable or conduit length. The retraction cable 56 extends from the bracket 72 around a carrier assembly idler pulley 78 which is rotatably attached to the carrier assembly 50 by means of a bolt 80. The retractor cable 56 passes from the carrier assembly idler pulley 78 to a rear outer boom idler pulley 82, which is rotatably attached to the inner surface of the outer boom 14 by means of a bracket 84 and a bolt 86. From the rear outer boom idler pulley 82, the retraction cable 56 passes along the lower surface of the outer boom 14 to a front outer boom idler pulley 88, which is rotatably attached to the outer boom 14 by means of a bracket (not shown) and a bolt 90. The retraction cable 56 passes around the front idler pulley 88 and is attached to the inner boom 16 adjacent the carrier assembly 50 at an aperture 92, into which an end 94 of the carrier retractor cable 56 is inserted and held by means of a swaged sleeve 96.

In addition to the components previously specifically referred to, the carrier assembly 50 includes a pair of conduit shields 98, which shield portions of the sheaves 52 so as to protect the flexible conduit 54, the shields 98 being fixed, by welding or the like, directly to a cylindrical portion 50A of the carrier assembly 50 which engages the cylinder rod 38. The shields 98 are also fastened to one another by a pair of cross bars 100, which also function to hold the carrier assembly idler pulley 78 (see FIG. 4) mounted on an axle 102 so as to be freely rotatable, the axle being fixed to the cylindrical portion 50A of the carrier assembly 50. In the event the flexible conduits 54 should become slack around the sheaves 52, which can occur from wear or from misadjustment of the carrier retractor cable tension by the fastener 74, the conduits 54 may slip off the sheaves 52 in operation. The shields 98 prevent such failures.

Figures 5, 6, 7:
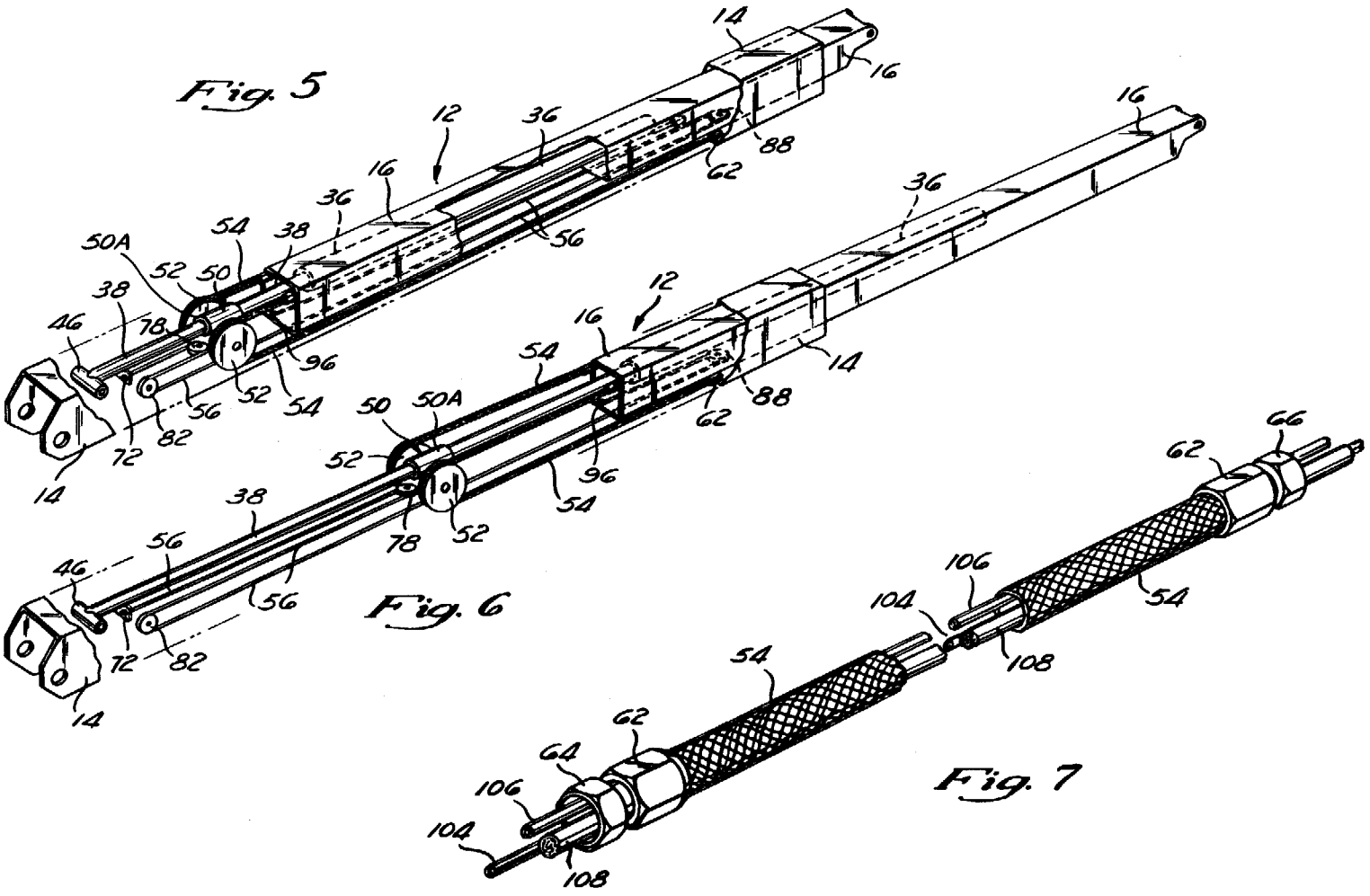
FIG. 5 is a partial perspective view of the boom of FIG. 2 in its retracted position.
FIG. 6 is a partial perspective view of the boom of FIG. 2 in its extended position.
FIG. 7 is a view of the control cable flexible conduit according to the present invention utilized to house the hydraulic and electrical cables in the extensible boom.

Referring now to FIGS. 5 and 6, the boom 12 retracted and extended positions are shown to better illustrate the movement of the carrier assembly 50 in conjunction with the retractor cable 56. In FIG. 5, the boom is shown in its retracted position, and in FIG. 6 the boom is shown in its condition of maximum extension. A comparison of FIGS. 5 and 6 will show that the carrier assembly 50 moves only one-half the distance moved by the inner boom 16. Whether in extension or retraction, the movement of the carrier assembly 50 is precisely controlled by the carrier retractor cable 56 and associated components, so that the flexible conduits 54 are always under a predetermined initial tension.

Referring now to FIG. 7, there is shown, partially broken away, one of the flexible conduits 54, together with the control lines contained therein. The flexible conduit preferably consists of a braided metal sheath. As seen in FIG. 7, a plurality of control lines 104, 106, 108 are contained within the conduit 54. The individual control lines may be either single or multiple conductor electrical cables or may be flexible hydraulic or pneumatic lines.

Referring now to FIG. 8, there is shown, in section, a cross-sectional view of the rod-fed hydraulic cylinder described heretofore as including the extension cylinder 36 and cylinder rod 38. The cylinder rod 38 has an inlet body portion 38B which has an extension fluid inlet 110 and a retraction fluid inlet 112 formed therein, to which the hydraulic fluid inlet assembly 58 and retraction assembly 60 (see FIG. 3) are attached. The extension fluid inlet 110 opens into an extension fluid passage 114 formed in the body portion 38B. The retraction fluid inlet 112 similarly opens into a retraction fluid passage 116. The extension fluid passage 114 terminates at the fluid feed tube 38A, which is fixed to the inlet body portion 38B. The inlet body portion 38B is also connected to a cylinder rod sleeve 38C. Between the fluid feed tube 38A and the cylinder rod sleeve 38C, a first retraction fluid reservoir 118 is formed, into which the retraction fluid passage 116 opens. The cylinder rod sleeve 38C has a plurality of apertures 120 formed therein so as to provide hydraulic fluid communication between the first retraction fluid reservoir 118 and a second retraction fluid reservoir 122, formed between the extension cylinder 36 and the cylinder rod sleeve 38C. A hydraulic cylinder piston 124 is disposed within the cylinder 36 at the termination of the cylinder sleeve 38C opposite the inlet body 38B. The fluid feed tube 38A passes through and is fixed to the piston 124 and opens into an extension fluid reservoir 126 formed by a cylinder end cap 128, which closes the end of the cylinder 36 and to which the bracket 40 is fixed by welding or other conventional means. The cylinder rod sleeve 38C is also fixed to the piston 124.

In operation, the cylinder rod 38 is fixed to the outer boom 14 by the pin 48 (see FIG. 3). When the boom 12 is to be extended, hydraulic fluid is applied under pressure to the extension fluid inlet 110 through the extension inlet assembly 58 and passes through the extension passage 114 and the fluid feed tube 38A into the extension fluid reservoir 126. Because the rod is fixed, this hydraulic fluid pressure causes the cylinder 36 to move relative to the rod 38, and, as the cylinder 36 is fixed to the inner boom 16, the inner boom 16 moves outwardly causing the boom 12 to extend. In retraction, hydraulic fluid under pressure is applied to the retraction fluid inlet 112 through the retraction inlet assembly 60, and passes through the retraction fluid passage 116 into the first retraction fluid reservoir 118 and, through the apertures 120, into the second retraction fluid reservoir 122. The second retraction fluid reservoir, at its end adjacent the T-shaped termination 46, is closed by a sealing flange portion 130 formed on the cylinder 36, so that, during boom extension, the second retraction fluid reservoir 122 has decreased in volume. By application of hydraulic fluid under pressure to the second retraction fluid reservoir, the sealing flange portion 130 is urged toward the T-shaped termination 46, thereby retracting the inner boom 16 into the outer boom 14.

In FIG. 9, there is shown a side elevational view of a counterweight assembly 140 according to the present invention for use in the lift 10. The counterweight assembly 140 includes a counterweight body 142 mounted on a turret base plate 144. The turret base plate is connected to the frame 18 so as to be rotatable thereon about the axis of rotation shown in FIG. 9. The counterweight body 142 has, attached to the upper rear portion thereof, a pair of boom mounting brackets 146 (see FIG. 10) and a self-leveling master hydraulic cylinder mounting bracket 148. The boom mounting brackets each have an aperture 146A, which is the point of pivotal attachment of the boom 12 to the lift 10 by means of the boom mounting pin 34. The self-leveling system referred to includes a master cylinder (not shown) and the slave cylinder 28. The master cylinder is attached to the mounting bracket 148 to provide the hydraulic fluid control for the slave cylinder 28 for the self-leveling feature for the workman's platform 26.

As is seen in FIGS. 9 and 10, FIG. 10 being a plan view of the counterweight assembly 140, the counterweight body 142 has a round rear portion 150 remote from the axis of rotation and a straight front portion 152 adjacent the axis of rotation. A pair of lift cylinder mounting brackets 154 are fixed to the front body portion 152 and have the lift cylinder 24 (see FIG. 1) pivotally attached thereto. Additional structural strength for the counterweight assembly 140 is provided by a pair of rectangular tubes 155 fixed to the turret plate and flat side portions 156 of the counterweight body 142. The counterweight body 142 has a sloping upper surface 158, which slopes downwardly from the rear side thereof toward the front side. The downwardly sloping upper surface [permit] *permits* the lowering of the boom 12 to horizontal or below horizontal positions.

The turret plate 144 is rotatably attached to the frame 18 by any conventional means. Depending upon the particular equipment to be utilized, the various power sources required by the lift 10 may be mounted on the turret or base plate 144, the frame 18, and the counterweight assembly 140. In FIG. 1, the housing 20 has a bifurcated cover 143, which may be, for example, of heavy duty plastic material. The cover 143 is positioned along the sloping top 158 and front 152 of the counterweight [assembly] *body* 142 so as to permit the boom 12 to be lowered to a below-horizontal position, as previously described. As will be apparent from FIGS. 1 and 9 [through 11, the counterweight 142 comprises a portion] *through 11, the counterweight body 142 comprises the peripheral portion* of the body or housing 20 most remote from the axis of rotation, and the cover 143 extends forward from the counterweight *body* 142 to laterally enclose the axis of rotation. In the preferred embodiment, the housing 20 also includes fuel tanks for the lift 10, which are mounted on the sloping upper surface of the counterweight body 142 and are enclosed by the cover 143 of the housing 20.

The counterweight itself may, for example, consist of a steel casing which is loaded with ballast material to provide the desired weight and is then sealed. Because of the disposition of the boom mounting bracket 146 on the counterweight body 142, it will be apparent that the center of gravity of the counter-weight assembly 140 is always located between the point of pivotal connection of the boom 12 on the counterweight assembly 140 and the axis of rotation of the boom with respect to the lift 10.

Referring now to FIG. 11, the lift 10 of the present invention is shown with the boom in its most upright position, which is the condition which presents the greatest danger of back tipping of the lift when operated on an inclination. As is seen in FIG. 11, the lift 10 has a center of gravity location 160, which lies well within the track of the [lit] *lift* frame and is disposed between the axis of rotation of the housing 20 (and thus the boom 12) and the point of pivotal attachment 146A for the boom 12 Thus, the lift 10 will not back tip.

This stability against back tipping is to be contrasted with prior art lifts such as the lift 162 illustrates in FIG. 12. In such a prior art lift, a frame 164 has wheels 166 mounted thereon so as to be self-propelled by locomotion apparatus (not shown). The lift 162 has [a] *an* extensible boom 168 which is pivotally mounted to a housing 170 at a pivot point 172. The lift 162 has a counterweight assembly 174 attached to the housing to provide a center of gravity location 176 which is well outside the track formed by the wheels 166. Further, as will be seen from FIG. 12, the pivot point 172 for the boom 168, with respect to its axis of rotation in the lift 162, is located between the lift center of gravity 176 and the axis of rotation. Thus, the prior art lift 162, when in the upright position, and especially when operating on an inclination, is in danger of or will actually tip over, with the resultant damage to the lift and injury to the workman operating the lift from the workman's platform.

This danger of back tipping is avoided by the present invention in two respects. The center of gravity for the lift is always located between the pivot point of the boom and the axis of rotation of the boom. Additionally, in the preferred embodiment, further stability is provided by locating the center of gravity of the counterweight assembly within the track of the lift. When so located, the lift can not back tip under any normal conditions of operation. The angle of inclination required for such back tipping is so great as to give the workman adequate advance warning of the danger present, so that appropriate corrective positioning of the lift can be undertaken.

Additionally, by locating the center of gravity of the lift as provided by the present invention, the lift may operate in much more confined passageways than the prior art lifts, as will be evident from a comparison of FIGS. 11 and 12. Such operation provides for greatly increased warehouse capacity and the like, since the necessity for the wider access aisles in conventional warehouse operation is obviated. The aisles need be no wider than the lift itself, since rotation, in the preferred embodiment, of the housing 20 does not cause the housing 20 to extend beyond the track of the lift formed by the frame 18 and wheels 22, as contrasted to the great extension of the prior art lift 162 housing beyond the track of the lift when rotated for lateral positioning of the workman's platform.

By pivoting the boom from the upper rear surface of the counterweight *body* a longer boom reach results than for comparable prior art lifts, while the greater proximity of the counterweight *body* center of gravity to the lift axis of rotation simultaneously provides the ease of access in operation. In addition to the increased reach due to location on the upper surface of the counterweight *body* , a longer boom can be utilized as compared to prior art lifts. Thus, because the boom attaches directly to the top rear of the counterweight *body*, it is possible to design a longer boom to reach greater heights and place the counterweight assembly, and therefore the boom pivot pin, much closer to the axis of rotation as compared to the distance on a conventional lift of this type. Furthermore, since the workman's platform on the longer boom would be further away from the axis of rotation if the counterweight *body* remained in the same location as on a shorter boom lift, the counterweight *body* and boom pivot pin may be relocated to a slightly greater distance from the axis of rotation to compensate for the increased positive overturning moment imposed by a loaded platform with the boom in its horizontal position. This relocation of the boom pivot pin moves the workman's platform closer to the axis of rotation when the boom is in the elevated position, enabling the workman to work closer to the axis of rotation, and thereby simplifying the lift maneuvering required by the workman in that lift configuration when working.

The invention claimed is:

[1. In a lift, the combination of a self propelled frame;

a boom; and a body mounted on said frame so as to be selectively rotatable thereon about an axis of rotation; said body including (a) a counterweight with a center of gravity, said counterweight being fixed to said body so as to form a portion thereof which is most remote from the axis of rotation, and (b) means for pivotally attaching said boom to said body so that the counterweight center of gravity is always disposed between the boom pivotal attachment and the axis of rotation.]

[2. The lift of claim 1, and in which the frame has four wheels rotatably attached thereto, the lift having a track which is determined thereby, and in which the counterweight is disposed on the body with respect to the axis of rotation so that the rotation of the body rotates the counterweight within the track of the lift.]

[3. The lift of claim 1, and in which the frame has four wheels rotatably attached thereto, the lift having a track which is determined thereby, and in which the counterweight is so disposed on the body with respect to the axis of rotation so that the rotation of the body rotates the counterweight center of gravity within the track of the lift.]

[4. The lift of claims 1, 2 or 3, and in which the counterweight has a front side adjacent the axis of rotation, a back side remote from the axis of rotation, and a top side intersecting the front and back sides, and in which the boom is pivotally attached to the counterweight adjacent the intersection of the top and back sides.]

5. The lift of claim [4] *16* and in which the top side slopes downwardly from [the] back side to the front side.

[6. The lift of claim 4, and in which the boom is pivotally attached to the top side of the counterweight.]

[7. The lift of claim 5, and in which the boom is pivotally attached to the top side of the counterweight.]

[8. In a lift, the combination of a self-propelled frame including four wheels defining a track for the lift;

a body mounted on said frame, said body being rotatable about an axis of rotation with respect to said frame;

said body including counterweight means mounted at one side thereof so as to be rotatable about said axis of rotation, said counterweight means being displaced from said axis of rotation and having a front side adjacent said axis of rotation, a back side remote from said axis of rotation, a top side intersecting said front and back sides, and a center of gravity located between the front and back sides;

a boom; and means for pivotally attaching the boom to the body so that the center of gravity of the counterweight means is always disposed between the point of pivotal attachment and said axis of rotation.]

9. The combination of claim [8] *19* and in which the boom is extensible, said extensible boom comprising:

an outer boom, said outer boom being pivotally attached to the counterweight means;

an inner boom terminating in a workman's platform, said inner boom being disposed within said outer boom;

means for selectively initiating relative movement between the inner boom and the outer boom so as to move the workman's platform away from or toward the frame including a hydraulic cylinder fixed to the inner boom interior remote from the pivotal connection and a cylinder rod fixed to the outer boom adjacent the pivotal connection, and means for selectively applying hydraulic fluid to said cylinder to initiate relative movement between the cylinder and cylinder rod;

remote lift control means located at the workman's platform; and means for connecting said remote lift control means to the lift including control lines extending to the workman's platform, said lines passing through the inner and outer booms, flexible conduits having first ends fixed to the outer boom interior remote from the pivotal connection and second ends fixed to the inner boom interior adjacent the pivotal connection, said control lines passing through said conduits, a carrier assembly mounted on and slidable along the cylinder rod, a sheave from each flexible conduit and having an outer surface around a portion of which said flexible conduit passes, means fixing each sheave to the carrier assembly, and carrier assembly retraction means for moving said carrier assembly along the cylinder rod in the direction of movement of the inner boom but at one-half the rate of movement thereof, comprising (a) a retraction cable (b) means for attaching one end of the retraction cable to the outer boom interior adjacent the pivotal connection (c) a carriage idler pulley attached to the carrier assembly (d) a rear outer boom idler pulley attached to the outer boom interior adjacent the pivotal connection (e) a front outer boom idler pulley attached to the outer boom interior remote from the pivotal connection, (f) means for attaching the second end of the retraction cable to the inner boom adjacent the pivotal connection, and (g) a shield for each sheave, said shield being attached to the carrier assembly and disposed so as to cover a substantial portion of the sheave outer surface over which the flexible conduit passes so as to prevent the flexible conduit, if slack, from sliding off the sheave.

[10. In an extensible boom, the combination of: an outer boom;

an inner boom disposed within and extending outwardly from a first end of said outer boom;

means for selectively initiating relative movement between the inner boom and the outer boom so as to move the inner boom outwardly through said outer boom first end including a rod-fed hydraulic actuator having a cylinder fixed to the inner boom interior and a cylinder rod fixed to the outer boom;

control lines passing through the inner and outer booms;

flexible conduits having first ends fixed to the outer boom interior adjacent said outer boom first end and second ends fixed to the inner boom interior remote from said outer boom first end, said control lines passing through said conduits;

a carrier assembly mounted on and slidable along the cylinder rod;

a sheave for each flexible conduit and having an outer surface around a portion of which said flexible conduit passes;

means fixing each sheave to the carrier assembly; and carrier assembly retraction means for moving said carrier assembly along the cylinder rod in the direction of movement of the inner boom but at one-half the rate of movement thereof, comprising (a) a retraction cable, (b) means for attaching one end of the retraction cable to the outer boom interior remote from said outer boom first end, (c) a carriage idler pulley attached to the carrier assembly, (d) a rear outer boom idler pulley attached to the outer boom interior remote from said outer boom first end, (e) a front outer boom idler pulley attached to the outer boom interior adjacent the outer boom first end, (f) means for attaching the other end of the retraction cable to the inner boom remote from the outer boom first end, and (g) a shield for each sheave, said shield being attached to the carrier assembly and disposed so as to cover a substantial portion of the sheave outer surface over which the flexible conduit passes so as to prevent the flexible conduit, if slack, from sliding off the sheave.]

11. In a lift of the type having a self-propelled four-wheeled frame defining a track for the lift, and a boom, the combination of:

a housing comprising (a) a base mounted on said frame so as to be selectively rotatable about an axis of rotation and (b) a counterweight having a center of gravity and being fixed to said base so as to be rotatable therewith, said counterweight (i) being disposed on said base so as to be remote from said axis of rotation but with its center of gravity always within the lift track upon rotation of the base, and (ii) having a rear side remote from said axis of rotation and a front side adjacent thereto, and a top side which intersects said front and rear sides, said housing having a back of which said counterweight rear side forms at least a portion, and means for pivotally attaching said boom to said counterweight top side adjacent the rear side intersection and remote from the front side intersection, whereby the counterweight center of gravity is disposed between the axis of rotation and the boom pivotal attachment.

12. A lift according to claim 11, and in which the rear side of the counterweight is always within the lift track upon rotation.

13. A lift according to claims 11 or 12, and in which the top side slopes downwardly from the rear side intersection to the front side intersection to permit the boom to be lowered to a below-horizontal position.

*14. In a lift, the combination of*

*a self propelled frame;*

*a boom; and*

*a body mounted on said frame so as to be selectively rotatable thereon about an axis of rotation;*

*said rotatable body including*

*(a) a counterweight body with a center of gravity, said counterweight body being fixed to said rotatable body so as to comprise the peripheral portion thereof which is most remote from the axis of rotation, and*

*(b) means for pivotally attaching said boom to said rotatable body adjacent to said counterweight body so that the counterweight body center of gravity is always disposed between the boom pivotal attachment and the axis of rotation,*

*and in which the frame has four wheels rotatably attached thereto, the lift having a track which is determined thereby, and in which the counterweight body is disposed on the rotatable body with respect to the axis of rotation so that the rotation of the rotatable body rotates the counterweight body center of gravity within the track of the lift.*

*15. The lift of claim 14, and in which the counterweight body is disposed on the rotatable body with respect to the axis of rotation so that the rotation of the rotatable body rotates the counterweight body within the track of the lift.*

*16. The lift of claims 14 or 15, and in which the counterweight body has a front side adjacent the axis of rotation, a back side remote from the axis of rotation, and a top side intersecting the front and back sides, and in which the boom is pivotally attached to the counterweight body adjacent the intersection of the top and back sides.*

*17. The lift of claim 16, and in which the boom is pivotally attached to the top side of the counterweight body.*

*18. The lift of claim 5, and in which the boom is pivotally attached to the top side of the counterweight body.*

*19. In a lift, the combination of a self-propelled frame including four wheels defining a track for the lift;*

*a body mounted on said frame, said body being rotatable about an axis of rotation with respect to said frame;*

*said rotatable body including counterweight means mounted at the side thereof which is most remote from said axis of rotation so as to be rotatable about said axis of rotation, said counterweight means being displaced from said axis of rotation and having a front side adjacent said axis of rotation, a back side remote from said axis of rotation, a top side intersecting said front and back sides, and a center of gravity located within the track between the front and back sides;*

*a boom; and*

*means for pivotally attaching the boom to the rotatable body adjacent to said counterweight means so that the center of gravity of the counterweight means is always disposed within the track between the point of pivotal attachment and said axis of rotation.*

* * * * *